US006565940B1

(12) United States Patent
Lin

(10) Patent No.: US 6,565,940 B1
(45) Date of Patent: May 20, 2003

(54) FLOATING FOUNTAIN

(76) Inventor: Chung-Kuei Lin, 6F-4, No. 1, Wu-Chuan 1st Rd., Hsinchuang City, Taipei Hsien (TW)

( * ) Notice: Subject to any disclaimer, the term of this patent is extended or adjusted under 35 U.S.C. 154(b) by 41 days.

(21) Appl. No.: 10/002,482

(22) Filed: Nov. 1, 2001

(51) Int. Cl.[7] ................................................ B32B 17/08

(52) U.S. Cl. ........................ 428/64.1; 428/66.6; 239/17

(58) Field of Search ............................... 428/64.1, 66.6, 428/34.1, 36.9; 239/17

(56) References Cited

U.S. PATENT DOCUMENTS 4,819,874 A * 4/1989 Geiger ........................ 239/17

* cited by examiner

*Primary Examiner*—Alexander S. Thomas
(74) *Attorney, Agent, or Firm*—Thorp Reed & Armstrong, LLP

(57) ABSTRACT

A floating fountain includes a platform having a floating member received inside, an ornamental object securely mounted on the platform and having a channel defined inside, a tube securely connected to a bottom portion of the ornamental object and communicating with the channel, a hose further connected to and communicating with the tube, and a weighting member firmly mounted around the tube to stabilize the platform. By such an arrangement, the water flows through the hose, the tube, the channel and spills over on top of the ornamental object to form waterfalls. Moreover, the floating fountain is able to float freely to provide a unique ornamental effect.

1 Claim, 2 Drawing Sheets

FLOATING FOUNTAIN

BACKGROUND OF THE INVENTION

1. Field of the Invention

The present invention relates to a fountain, and more particularly to a floating fountain that floats freely on water of a pool to provide a unique ornamental effect.

2. Description of Related Art

A fountain is a popular apparatus used in a water pool of a garden to provide an ornamental effect. By utilizing soothing water movement, the fountain shows a taste of elegance and therefore has been increasingly popular in recent years. However, the fountains currently available are designed to be immovable. More specifically, the fountain is secured to a particular location in the water pool so that the ornamental effect provided by the water movement is rather dull.

Therefore, the present invention tends to provide to a floating fountain to overcome the aforementioned problem.

SUMMARY OF THE INVENTION

An objective of the present invention is to provide a floating fountain that floats freely on water of a pool. The floating fountain includes a platform having a floating member received inside, an ornamental object securely mounted on the platform and having a channel defined inside, a tube securely connected to a bottom portion of the ornamental object and communicating with the channel, a hose further connected to and communicating with the tube, and a weighting member firmly mounted around the tube to stabilize the platform. By such an arrangement, the water flows through the hose, the tube, the channel and spills over the top of the ornamental object to form waterfalls. Moreover, the floating fountain is able to float freely to provide a unique ornamental effect.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
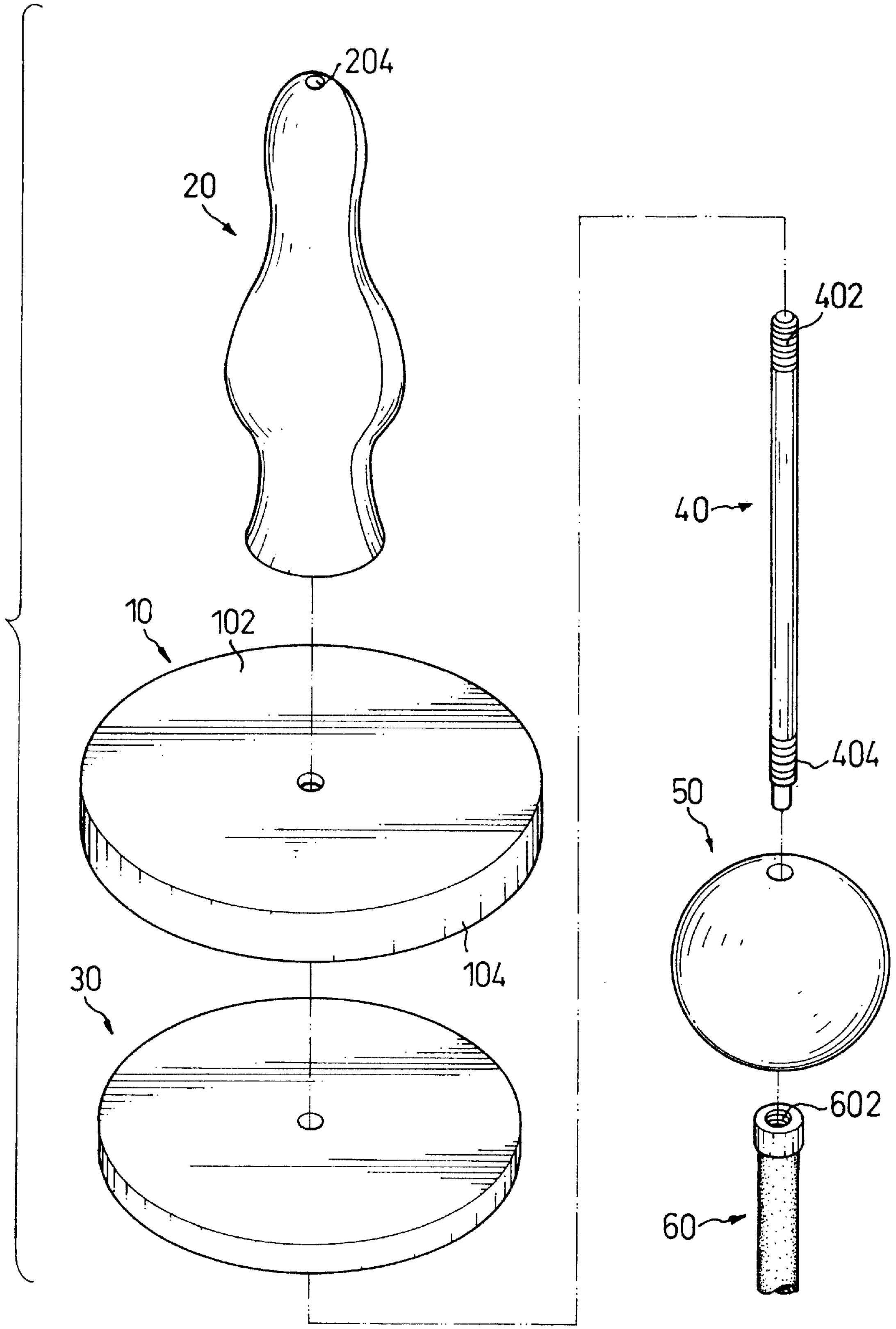
FIG. 1 is an exploded, perspective view of a floating fountain in accordance with the present invention.
Figure 2:
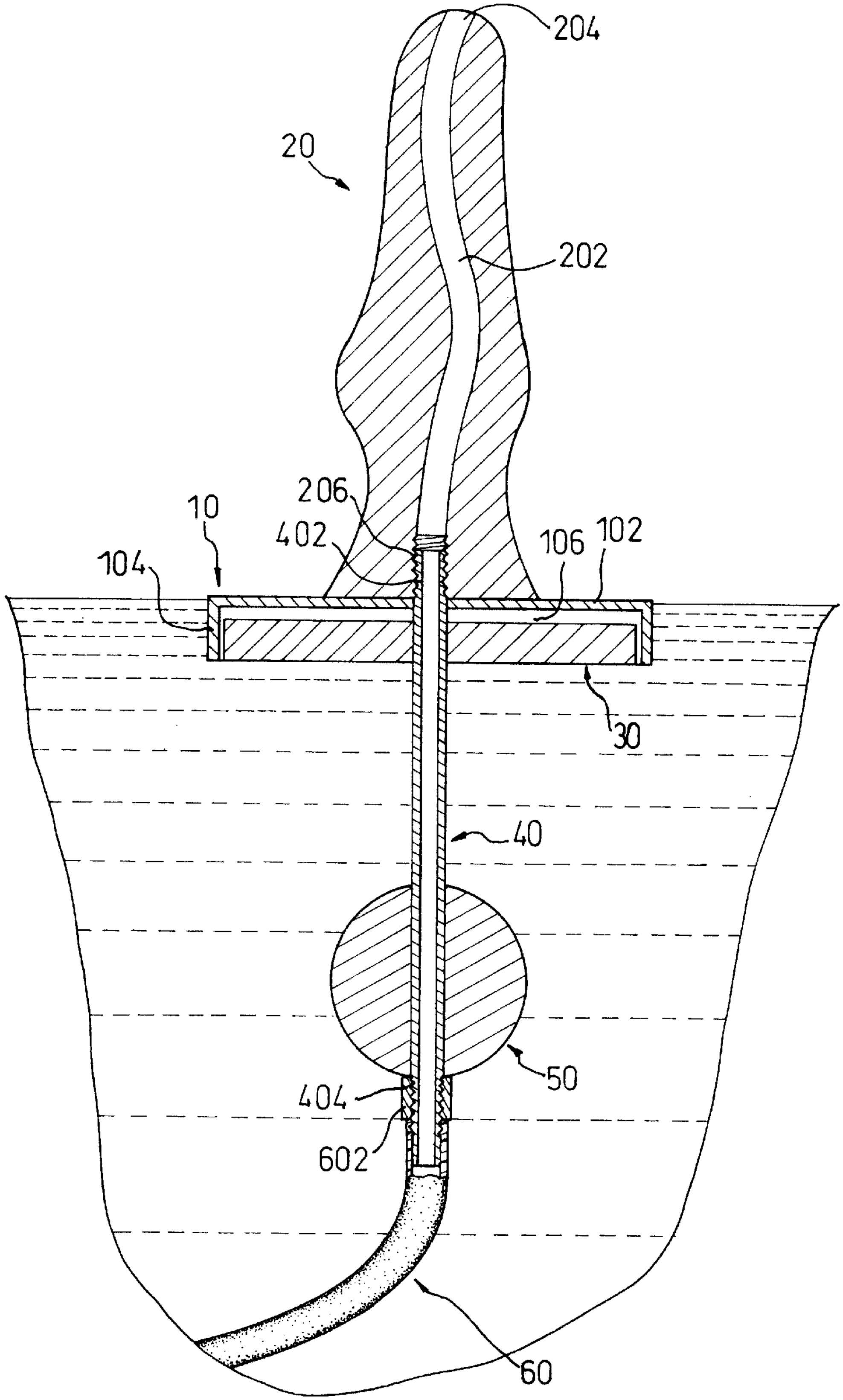
FIG. 2 is a cross-sectional view of the floating fountain in assembly and disposed in a pool.

With reference to FIGS. 1 and 2, a floating fountain in accordance with the present invention includes a platform (10), an ornamental object (20), a floating member (30), a tube (40), a weighting member (50), and a hose (60).

The platform (10) has a top surface (102) and an apron (104) extending downwardly from a perimeter of the top surface (102). The apron (104) defines a recess (106) under the platform (10) for receiving the floating member (30).

The ornamental object (20) is securely mounted on the top surface (102) of the platform (10) and has a passage (202) defined inside. The passage (202) vertically extends through the ornamental object (20) from the top to the bottom. An outlet (204) is defined in the top of the ornamental object (20) and communicates with the passage (202). First female threads (206) are formed in an inner surface defining the passage (202) close to the platform (10).

The floating member (30) is disposed in the recess (106) defined in the platform (10) and is made of a floating material so as to provide buoyancy to the platform (10).

The tube (40) is made of a rigid material, and has a top end and a bottom end. An outer surface of the tube (40) has a first male threads (402) and a second male threads (404) respectively formed close to a top end and a bottom end of the tube (40). The top end of the tube (40) is threadingly connected with the ornamental object (20) by mating of the first female threads (206) and the first male threads (402) so as to allow the tube (40) to communicate with the passage (202).

The weighting member (50) is mounted around the tube (40) and is made of a dense material submergible in the water to stabilize the platform (10).

The hose (60) is threadingly connected with the bottom end of the tube (40) by means of mating second female threads (602) formed in one end of the hose (60). The other end of the hose (60) is connected to a water supply.

When in operation, the floating fountain is typically disposed in a pool of a garden for ornamental purposes. Water from the water supply enters the floating fountain and travels via the hose (60), the tube (40), and the passage (202) and finally spurts out through the outlet (204) of the passage (202). The water spurted out creates water jets and/or waterfalls that enhance the taste and elegance of the garden. The main characteristic of the floating fountain is that it is able to float freely in the pool instead of being stationary and dull as are those conventional fountains. Accordingly, the floating fountain is able to move gradually by an external force such as a wind force and provides a unique ornamental effect.

While this invention has been particularly shown and described with references to the preferred embodiment thereof, it will be understood by those skilled in the art that various changes in form and details may be made therein without departing from the scope of the invention encompassed by the appended claims.

What is claimed is:

1. A floating fountain comprising:

a platform having a top surface and an apron extending downwardly from a perimeter of the top surface, the apron defining a recess;

an ornamental object securely mounted on the top surface of the platform and having a passage defined through the ornamental object, the passage having first female threads formed in an inner surface defining the passage and close to the platform;

a floating member securely received in the recess to provide buoyancy to the fountain;

a tube communicated with the passage, and having a top end and a bottom end, the top end having first male threads threadingly mated with the first female threads, the bottom end having second male threads;

a weighting member mounted around the tube to stabilize the platform; and a hose communicated with the tube, and having one end formed with second female threads threadingly mated with the second male threads, the other end of the hose adapted to connect to a water supply.

* * * * *